United States Patent [19]

Pantone

[11] Patent Number: 5,794,601
[45] Date of Patent: Aug. 18, 1998

[54] FUEL PRETREATER APPARATUS AND METHOD

[76] Inventor: Paul Pantone, 41 E. 300 South, Price, Utah 84501

[21] Appl. No.: 858,085

[22] Filed: May 16, 1997

[51] Int. Cl.$^6$ .................................................. F02M 31/18
[52] U.S. Cl. .......................... 123/538; 123/557; 123/575; 123/568
[58] Field of Search .................... 123/538, 557, 123/575, 1 A, 568

[56] References Cited

U.S. PATENT DOCUMENTS

| | | | |
|---|---|---|---|
| 4,267,976 | 5/1981 | Chatwin | 123/538 |
| 4,418,653 | 12/1983 | Yoon . | |
| 4,524,746 | 6/1985 | Hansen | 123/538 |
| 4,567,857 | 2/1986 | Houseman et al. . | |
| 4,735,186 | 4/1988 | Parsons . | |
| 5,059,217 | 10/1991 | Arroyo et al. | 123/538 |
| 5,074,273 | 12/1991 | Brown | 123/538 |
| 5,357,908 | 10/1994 | Sung et al. . | |
| 5,379,728 | 1/1995 | Cooke . | |
| 5,408,973 | 4/1995 | Spangjer | 123/538 |
| 5,443,052 | 8/1995 | Aslin | 123/575 |

OTHER PUBLICATIONS

PCT Publication No. WO 96/14501—May 17, 1996.
Marin Independent Journal, Nov. 1992 "In quest of perfect engine".
Exotic Research Report, vol. 1 #2 Apr.–Jun. 1996, pp. 23–26.

Primary Examiner—Marguerite McMahon
Attorney, Agent, or Firm—Mallinckrodt & Mallinckrodt

[57] ABSTRACT

A novel fuel pretreater apparatus and method for pretreating an alternate fuel to render it usable as the fuel source for fuel burning equipment such as internal combustion engines, furnaces, boilers, and turbines, includes a volatilization chamber into which the alternate fuel is received. An exhaust plenum may enclose the volatilization chamber so that thermal energy supplied by exhaust from the fuel burning equipment can be used to help volatilize the alternate fuel. A bypass stream of exhaust may be diverted through the alternate fuel in the volatilization chamber to help in volatilizing the alternate fuel and help carry the volatilized fuel through a heated reactor prior to its being introduced into the fuel burning equipment. The reactor is preferably interposed in the exhaust conduit and is formed by a reactor tube having a reactor rod mounted coaxially therein in spaced relationship. The exhaust passing through the exhaust conduit provides thermal energy to the reactor to pretreat the alternate fuel.

18 Claims, 2 Drawing Sheets

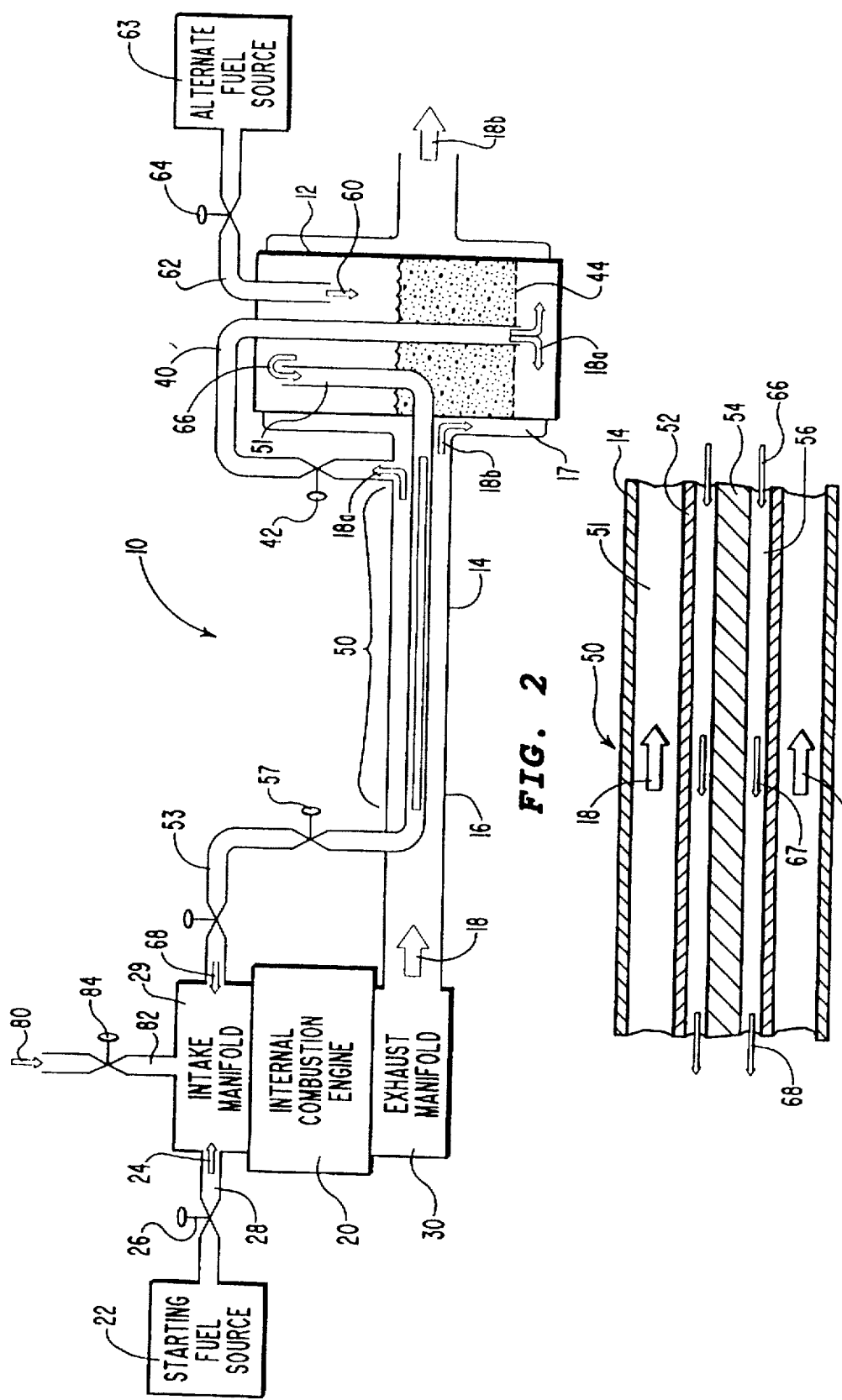

FUEL PRETREATER APPARATUS AND METHOD

BACKGROUND OF THE INVENTION

1. Field

This invention relates to fuel burning equipment and, more particularly, to a novel fuel pretreater apparatus and method for making it possible for such fuel burning equipment to utilize as a fuel a material not otherwise considered suitable as a fuel for such equipment.

2. State of the Art

Most fuel burning equipment in use today is designed to burn a particular fuel. For example, internal combustion engines are designed to burn gasoline or diesel fuel, furnaces and boilers to burn natural gas, oil, or coal, and turbines to burn kerosene or jet fuel. Fuels or other materials other than the fuels for which the equipment is designed to burn cannot generally be used in such equipment.

For example, in internal combustion engines, particularly in light of the extreme sophistication of many current engines, not only for fuel economy but also for reduction in the emitted pollutants, great care is taken in the selection of the fuel grade particularly as to its quality prior to its introduction into the internal combustion engine. One does not consider crude oil or recycled materials such as used motor oil, cleaning solvents, paint thinner, alcohol, and the like, as a suitable fuel source for an internal combustion engine. Further such materials would not be considered suitable fuels for furnaces, boilers, turbines, or most other fuel burning equipment. In addition, one would not consider using such fuels if contaminated by water, nor would one consider using nonfuels such as used battery acid or other waste products as fuels for fuel burning equipment.

SUMMARY OF THE INVENTION

The present invention is a novel fuel pretreater apparatus and method for fuel burning equipment. This novel fuel pretreater enables the fuel burning equipment to utilize as fuels combustible products selected from material such as crude oil or recycled materials such as motor oils, paint thinners, solvents, alcohols, and the like and noncombustible products such as battery acid. Any substance that can be preheated and then burned in the fuel burning equipment will be referred to as alternate fuel. This alternate fuel is introduced as a liquid into a volatilization chamber. The volatilization chamber may be heated to aid in volatilization and in most cases may be advantageously heated by thermal energy from the exhaust in the exhaust conduit of the fuel burning equipment. A portion of the exhaust may even be bubbled through the alternate fuel to assist in the volatilization of the alternate fuel. The fuel vapor produced in the volatilization chamber is drawn through a heated thermal pretreater. The thermal pretreater may be mounted, preferably concentrically, inside the exhaust conduit to be heated by the exhaust gases. The thermal pretreater serves as a reactor and is configured as a reactor tube having a reactor rod mounted, preferably concentrically, therein with a reduced annular space surrounding the rod. The volatilized alternate fuel passes through this annular space where it is subjected to thermal pretreatment prior to being introduced into the intake system of the fuel burning equipment.

THE DRAWINGS

The best mode presently contemplated for carrying out the invention is illustrated in the accompanying drawings, in which:

FIG. 1 is a block diagram of a basic fuel pretreating apparatus of this invention;

FIG. 2, a schematic flow diagram of the novel fuel pretreater apparatus of this invention shown in the environment of an internal combustion engine; and FIG. 3, an enlarged cross-sectional view of a schematic of the reactor portion of the fuel pretreater of FIG. 2.

DETAILED DESCRIPTION OF THE ILLUSTRATED EMBODIMENT

Figure 1:
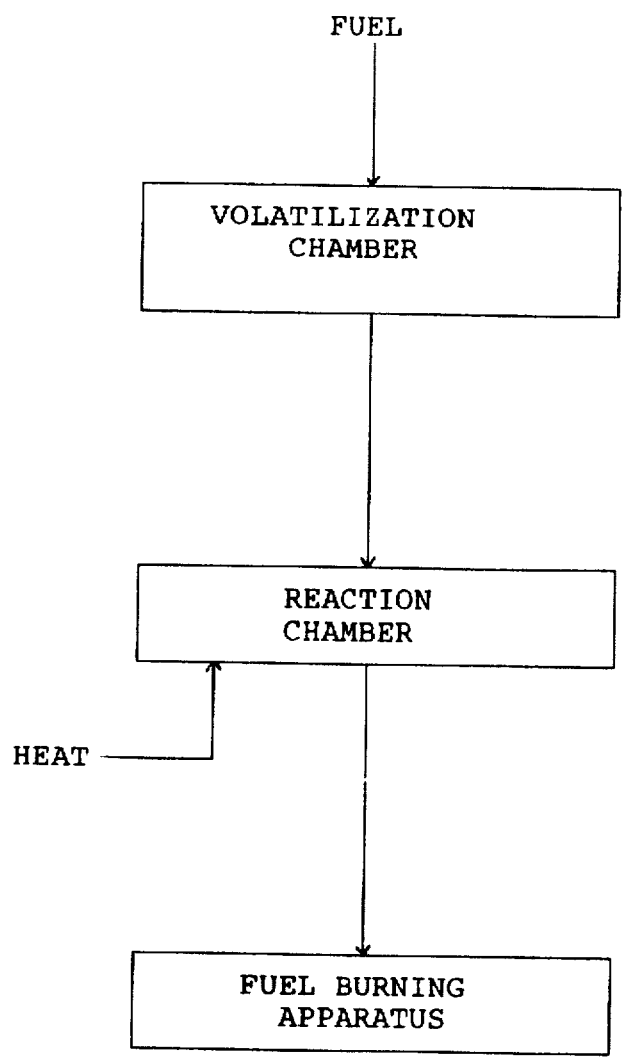

The invention is best understood from the following description and the appended claims taken in conjunction with the accompanying drawings wherein like parts are designated by like numerals throughout.

The present invention is a unique apparatus and method for pretreating materials to be used as fuel for fuel burning equipment such as internal combustion engines, furnaces, boilers, turbines, etc. The pretreatment makes it possible for the fuel burning equipment to utilize as its fuel source fuels or other materials that are generally considered as not being suitable fuels for such fuel burning equipment. These alternate fuels include almost any liquid hydrocarbon such as crude oil or recycled material such as motor oil, solvents, paint thinners, and various alcohols, to name several. These alternate fuels may even be contaminated with water or may be material such as used battery acid which is not considered combustible or a fuel. Importantly, as shown in FIG. 1, the alternate fuel is volatilized in a volatilization chamber and is then subjected to a high temperature environment in a heated reaction chamber prior to its being introduced into the intake system of the fuel burning equipment. The reaction chamber provides a heated reaction zone with a reaction rod therein about which the fuel flows. It is this flow through the heated reaction zone about the reaction rod which makes the fuel suitable for burning in the fuel burning equipment. In most cases, since the fuel burning equipment involved will produce high temperature exhaust gases, in order to save energy, the heating for the reaction chamber will be provided by the exhaust gases from the fuel burning equipment. The reaction chamber will thus usually be positioned in the exhaust conduit, whether an exhaust pipe, flue, chimney, etc., leading from the fuel burning equipment. It is believed important that the fuel flow through the reaction chamber be opposite the flow of exhaust gas in the exhaust conduit so that the most intense heating of the reaction chamber is at the end thereof where the fuel exits the reaction chamber. Currently, it is not known precisely what happens to the volatilized alternate fuel in this high temperature environment although one speculation is that the larger molecules are broken down into smaller molecular subunits of the heavy molecules.

In any event, I have found, for example, that I am able to satisfactorily operate an internal combustion engine using as my fuel source materials generally considered to be totally unsuitable as fuels for an internal combustion engine. For example, in one experimental run I was able to successfully operate an internal combustion engine using recycled motor oil. In another experimental run I was able to operate the internal combustion engine using crude oil as my sole fuel source. In yet another run I was able to use waste battery acid as my sole fuel source.

However, I should state at this point that when the reaction chamber is heated by exhaust gases from the engine, in order to generate sufficient thermal energy necessary to volatilize the alternate fuel in the volatilization chamber, it is necessary to operate the internal combustion engine initially using ordinary gasoline. This step is necessary since, absent my unique pretreatment process, it is impossible to operate an internal combustion engine with the alternate fuels that I am using. Accordingly, the internal combustion engine is started and operated for an initial period until sufficient thermal energy has been generated in order to initiate the volatilization and the pretreatment processes. Once these processes are self sustaining, the fuel system is switched over from the gasoline system to the alternate fuel system. The internal combustion engine continues to operate for as long as the alternate fuel is supplied or until the internal combustion engine is switched off.

Similarly, with other fuel burning equipment, when the reaction chamber is positioned in the exhaust conduit, conventional fuels are supplied to the equipment upon start up and until sufficient thermal energy is supplied to the reaction chamber to produce fuel usable in the equipment from the alternate fuel.

The invention will be illustrated and described in detail with respect to an embodiment thereof for use with an internal combustion engine. Referring now to FIG. 2, the novel fuel pretreater apparatus of this invention is shown generally at 10 and includes a volatilization chamber 12 and a fuel pretreater section 14 incorporated into an exhaust conduit 16. Volatilization chamber 12 is enclosed in an exhaust plenum 17 through which a stream of exhaust 18 passes. Exhaust 18 is produced by an internal combustion engine 20 which can be any suitable internal combustion engine ranging in size from a small, one-cylinder internal combustion engine to a large, multicylinder internal combustion engine. Internal combustion engine 20 is shown herein schematically particularly since no claim is made to an internal combustion engine, per se, only to the novel fuel pretreater apparatus 10 shown and claimed herein.

Internal combustion engine 20 includes a fuel tank 22 which supplies a starting fuel 24 and has a valve 26 for controlling the flow of fuel 24 through a fuel line 28 into an intake manifold 29. Fuel 24 enters internal combustion engine 20 through an intake manifold 29 either through carburetion or fuel injection (not shown), both of which are conventional systems for introducing fuel 24 into internal combustion engine 20 and are, therefore, not shown herein but only indicated schematically through the depiction of intake manifold 29. Fuel 24 is ordinary gasoline and provides the necessary starting fuel for internal combustion engine 20 until sufficient thermal energy has been produced in order to sustain the operation of volatilization chamber 12 and pretreater section 14. Thereafter, valve 26 is closed and internal combustion engine 20 is operated as will be discussed more fully hereinafter. Internal combustion engine 20 produces exhaust 18 which is collected from internal combustion engine 20 by an exhaust manifold 30. Exhaust 18 is then directed through exhaust conduit 16 into fuel pretreater 10 where it provides the necessary thermal energy for the operation of fuel pretreater 10.

Exhaust 18b represents a portion of exhaust 18 and passes through plenum chamber 17 surrounding volatilization chamber 12 prior to exiting exhaust conduit 16. Exhaust 18b represents the residual portion of exhaust 18 since a bypass 40 diverts a portion of exhaust 18 (shown as exhaust 18a) into volatilization chamber 12. Plenum chamber 17 acts as a heat exchanger for transferring thermal energy from exhaust 18b to volatilization chamber 12. A valve 42 controls the amount of exhaust 18a diverted into volatilization chamber 12.

Volatilization chamber 12 receives a quantity of alternate fuel 60 through a fuel line 62 from an alternate fuel source 63 with the flow thereof being controlled by a valve 64. Alternate fuel 60 accumulates as a pool of alternate fuel 60 in the bottom of volatilization chamber 12. Bypass 40 directs exhaust 18a into the bottom of the pool of alternate fuel 60 where a bubble plate 44 disperses exhaust 18a upwardly into the pool of alternate fuel 60 in order to assist in the volatilization of alternate fuel 60. However, the primary source of thermal energy for the volatilization of alternate fuel 60 is supplied by exhaust 18b as it passes through plenum chamber 17. The volatilized alternate fuel 60 is shown as volatilized fuel 66 which passes into an inlet 51 which is the end of reactor tube 52 extending upwardly into volatilization chamber 12.

Referring also to FIG. 3, an enlarged segment of pretreater section 14 is shown generally as a reactor 50 which includes a reactor tube 52 located concentrically inside exhaust conduit 16. A reactor rod 54 is mounted concentrically in spaced relationship inside reactor tube 52 to provide an annular space or reaction chamber 56. As shown, exhaust 18 passes through an annular space 51 surrounding reactor tube 52 where it transfers a portion of its thermal energy to reactor tube 52. Volatilized fuel 66 passes countercurrently through the annular space of reaction chamber 56. The turbulent mixing of volatilized fuel 66 as it passes through reactor 50 in combination with the thermal energy imparted to it from exhaust 18 along with what is believed to be a catalytic reaction therein initiated by reactor rod 54 produces a pretreated fuel 68. Pretreated fuel 68 is then directed through an intake line 53 (which is an extension of reactor tube 52) into intake manifold 29. A valve 57 in intake line 53 controls the flow of pretreated fuel 68 into intake manifold 29. Supplemental air 80 is introduced into pretreated fuel 68 through an air intake 82 with the flow of supplemental air 80 being controlled by a valve 84.

The presence of the reactor rod has been found important to operation of the invention. The make up of the reactor rod does not appear to be important. A steel reactor rod has been found satisfactory as have stainless steel, aluminum, brass, and ceramic reactor rods.

Steady state operation of internal combustion engine 20 involves exhaust 18 contributing thermal energy to reactor 50. A portion of exhaust 18 is diverted as exhaust 18a and bubbled through the pool of alternate fuel 60 in the bottom of volatilization chamber 12. Exhaust 18a combines with the volatilized fuel from alternate fuel 60 to provide volatilized fuel 66. Volatilized fuel 66 is drawn into inlet 51 thence through reaction chamber 56 of reactor tube 52. The balance of exhaust 18b passes through plenum chamber 17 where a substantial portion of the balance of the thermal energy in exhaust 18b is transferred into alternate fuel 60 to assist in the volatilization of the same.

The method of this invention is practiced by starting internal combustion engine 20 using starting fuel 24 obtained from starting fuel tank 22. The flow of starting fuel 24 through fuel inlet line 28 is controlled by valve 26. Valve 84 is opened initially to allow the free flow of air 80 through air intake 82 during this starting phase of internal combustion engine 20. Internal combustion engine 20 generates exhaust 18 which is collected in exhaust manifold 30 where it is then directed into exhaust conduit 16. Exhaust 18 contains a significant amount of thermal energy resulting from the combustion of starting fuel 24 in internal combustion engine 20. A portion of the thermal energy in exhaust 18 is used to heat reactor 50 and then to volatilize alternate fuel 60. Specifically, exhaust 18a is diverted through exhaust bypass line 40 into volatilization chamber 12 where exhaust 18a is dispersed by bubble plate 44 into alternate fuel 60.

Exhaust 18a transfers its thermal energy to alternate fuel 60 and also provides a carrier stream for the volatilized products of alternate fuel 60 so that this combination becomes volatilized alternate fuel 66 which is then drawn into intake 51. At this point it should be noted also that valve 84 is partially closed in order to create a partial vacuum in pretreated fuel line 53, which means that a partial vacuum will also be created in intake 51. Simultaneously, valves 42 and 57 are selectively controlled in order to suitably recirculate the flow of exhaust 18a and volatilized alternate fuel 66, respectively. In the meantime, the balance of exhaust 18 becomes exhaust 18b which passes through plenum chamber 17 where it transfers its thermal energy into volatilization chamber 12 and alternate fuel 60 therein. Accordingly, a major portion of the balance of thermal energy in exhaust 18 after exhaust 18 has passed through reactor 50 is transferred into alternate fuel 60 for the volatilization of the same.

Volatilized alternate fuel 66 is directed into reaction chamber 56 where it is subjected to the pretreatment process of this invention by becoming reaction fuel 67 and then pretreated fuel 68. At the present time I am unable to state with any degree of certainty precisely what happens to reaction fuel 67 in reaction chamber 56. However, I have found that the larger molecules in volatilized fuel 66 appear to be broken into fragments with some type of reaction taking place. Specifically, I have found that a portion of the length of reactor 50 becomes quite hot, substantially hotter than could otherwise be accounted for from the thermal energy from exhaust 18 alone. This surplus thermal energy implies that some form of reaction is occurring in reaction fuel 67 as it is transformed into pretreated fuel 68. For example, in one prototype of the invention, the end of the exhaust conduit 16 positioned adjacent the end of reactor 50 closest the exhaust manifold 30 maintained a temperature of between about 500°–700° F. The portion of exhaust conduit 16 positioned along the central portion of the reactor 50 had a temperature between about 600°–900° F., while the position of the exhaust conduit 16 positioned adjacent the end of the reaction chamber where the volatilized alternate fuel entered was at a temperature between about 200°–300° F. Thus, the position of the exhaust conduit along the central portion of the reactor 50 reached temperatures higher than would be expected from the temperature of the other position of the pipe. Pretreated fuel 68 is directed into intake manifold 29 where it becomes the fuel source for internal combustion engine 20.

The change over from starting fuel 24 to pretreated fuel 68 is accomplished by the careful adjustment of valves 26, 84, 57, and 42. In this manner, the operation of internal combustion engine 20 is smoothly transferred from sole reliance on starting fuel 24 to reliance entirely on pretreated fuel 68. Using the novel teachings of this invention, I have run internal combustion engine 20 on alternate fuel 60 selected from materials generally considered to be totally unsuitable as a fuel for internal combustion engine 20. These alternate fuels have included crude oil and recycled materials such as motor oil, paint thinners, alcohols, and the like. Also, such fuels having some water content have also been used. Many of these alternate fuels are waste products for which disposal is a significant problem. By being able to use such waste products as fuel, a major source of pollution is eliminated. Tests on the exhaust generated by the engine 20 burning the alternate fuels have indicated that such exhaust is much cleaner than exhaust normally generated by such engines when burning gasoline in normal manner (gasoline can be used in the system as the alternate fuel of the invention to operate the engine more efficiently and without significant pollutants in the exhaust).

The dimensions of the reaction chamber and the reaction rod are such that the rod forces the volatilized fuel to flow substantially along the wall of the reaction chamber. For a 350 cubic inch V-8 Chevrolet engine, a reaction tube of about one-half inch inside diameter is placed substantially concentrically in an exhaust pipe from the engine. The reaction rod has a diameter to leave a concentric space between the reaction rod and inside wall of the reaction tube of about 0.035–0.04 inches and the reaction rod is between about ten inches and twelve inches in length. Lighter fuels, such as gasoline, work with the larger spacing between the reaction rod and reaction tube wall and the shorter rod while the smaller spacing and longer length may be required for heavier fuels such as crude oil since the heavier fuels generally require more heating and velocity through the reaction zone. Similar dimensions have been found satisfactory for use with single cylinder engines such as those having up to about fifteen horsepower. The smaller engines seldom require a reaction rod greater in length than about four inches. Similar dimensions will be used with other internal combustion engines.

The various dimensions indicated are examples only and can vary, usually depending upon the type and size of engine, lfuel volume required, and the type of alternate fuels to be used. The important thing is that the passage for the volatilized alternate fuel through the reaction chamber be such as to cause the reaction to take place to convert the volatilized alternate fuel to the reaction fuel which is satisfactory for operating the engine.

While the invention has been described in detail in connection with an internal combustion engine, the invention can be used equally as well and in similar manner with any fuel burning equipment. Thus, it can be used to treat material so it can be used in fuel for furnaces and boilers in place of the normal natural gas, fuel oil, or coal, or to power turbines in place of the normal kerosene or jet fuel. The reaction chamber can be positioned in the exhaust conduit, such as a flue or chimney, similarly as it is placed in the exhaust conduit from the internal combustion engine shown.

Rather than heating the reaction chamber with exhaust gases from the fuel burning equipment being powered, and such heating is presently preferred because such heating is integrally a part of the equipment used which appears to provide optimum results, the reaction chamber could be heated by other means. Such other means, however, should be arranged to provide similar heating and heat gradients as are provided by the exhaust gas.

Whereas the volatilization chamber is shown as heated by the exhaust gas, the volatilization chamber could be heated by other means or, depending upon the material used as fuel, the volatilization chamber might not be heated at all. The important thing is that the material to be used as fuel is volatilized in the volatilization chamber so the volatilized material is drawn into the reaction chamber. As used herein, the volatilization chamber does not have to be a chamber as such, but may be any means which volatilizes the alternate fuel. It could be a carbuerator or an injection nozzle or other volatilizing or spray means. Further, it is not necessary that exhaust gas be combined with the volatilized fuel as it is in the embodiment described. It has been found that in most cases the invention works satisfactorily without exhaust gas in the volatilized fuel. In most instances the volatilization fuel will be drawn through the reaction chamber by a low pressure or a pump at the fuel inlet of the fuel burning equipment.

The fuel pretreater of the invention is a novel discovery in that it allows me to successfully operate fuel burning equipment using alternate fuels. As such, I am able to achieve several highly desirable goals, namely, the extraction of valuable energy from alternate fuel while at the same time removing alternate fuel from the waste stream; or, in the case of crude oil, using this material directly thereby eliminating the need to subject the same to the expensive and capital intensive refining processes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A pretreater apparatus for pretreating fuel to provide a suitable fuel for combustion in fuel burning apparatus, the apparatus having a fuel intake system and an exhaust system, the improvement comprising:

a volatilization chamber for volatilizating said fuel in said volatilization chamber;

a heated reactor tube through which the volatilized fuel flows;

a reactor rod mounted in the reactor tube around which the volatilized fuel flows as it flows through the reactor tube, the space between the reactor rod and the reactor tube through which the volatilized fuel flows forming a reaction zone; and inlet means for directing said reacted fuel into the intake system of the fuel burning apparatus.

2. A pretreater apparatus according to claim 1, comprising an exhaust conduit in fluid communication with the exhaust system of the fuel burning apparatus to receive exhaust from the fuel burning apparatus and wherein the heated reactor tube is mounted in the exhaust conduit and is heated by exhaust gases passing through the exhaust conduit.

3. A pretreater apparatus according to claim 2, wherein the reaction tube is mounted in the exhaust conduit so that flow of volatilized fuel through the reactor tube is countercurrent the flow of exhaust gases through the exhaust conduit.

4. A pretreater apparatus according to claim 3, wherein the volatilization chamber is heated.

5. A pretreater apparatus according to claim 4, wherein the volatilization chamber is connected to the exhaust conduit downstream of the reactor tube whereby heat from the exhaust gases heat the volatilization chamber.

6. A pretreater apparatus according to claim 5, including an exhaust bypass means for diverting a portion of the exhaust gas from the exhaust conduit through the alternate fuel.

7. The pretreater apparatus defined in claim 6 wherein said exhaust bypass means includes a bubble plate in said volatilization chamber for bubbling said exhaust diverted into said volatilization chamber.

8. The pretreater apparatus defined in claim 1 wherein said reactor tube is mounted coaxially and in spaced relationship in said exhaust conduit, and said reactor rod is mounted coaxially and in spaced relationship in said reactor tube, said spaced relationship between said reactor rod and said reactor tube forming the reaction zone.

9. A pretreater apparatus for pretreating an alternate fuel to provide a suitable fuel for an internal combustion engine, the internal combustion engine having a fuel intake system and an exhaust system, the improvement comprising:

an exhaust conduit having a first end and a second end, said first end being connected in fluid communication with the exhaust system of the internal combustion engine to receive exhaust from the internal combustion engine;

an exhaust plenum at said second end of said exhaust conduit;

a volatilization chamber interposed in said exhaust plenum, said volatilization chamber receiving thermal energy from an exhaust passing through said exhaust plenum;

an alternate fuel in said volatilization chamber;

volatilization means for volatilizating said alternate fuel in said volatilization chamber;

exhaust bypass means for diverting a portion of said exhaust from said exhaust conduit through said alternate fuel;

removal means for removing said volatilized alternate fuel from said volatilization chamber;

a reactor tube mounted in said exhaust conduit through which the volatilized alternate fuel flows;

a reactor rod mounted in the reactor tube around which the volatilized alternate fuel flows as it flows through the reactor tube, the space between the reactor rod and the reactor tube through which the volatilized alternate fuel flows forming a reaction zone; and inlet means for directing said reacted fuel into the intake system of the internal combustion engine.

10. The pretreater apparatus defined in claim 9 wherein said exhaust bypass means includes a bubble plate in said volatilization chamber for bubbling said exhaust diverted into said volatilization chamber.

11. The pretreater apparatus defined in claim 9 wherein said reactor tube is mounted coaxially and in spaced relationship in said exhaust conduit, and said reactor rod is mounted coaxially and in spaced relationship in said reactor tube, said spaced relationship between said reactor rod and said reactor tube forming the reaction zone.

12. The pretreater apparatus defined in claim 9 wherein said alternate fuel is selected from a hydrocarbon other than a conventional fuel, said hydrocarbon being selected from the group consisting of crude petroleum, used paint thinner, used motor oil, and organic solvents.

13. The pretreater defined in claim 12 wherein said alternate fuel includes a supply of said alternate fuel.

14. The pretreater apparatus defined in claim 9 including control means for selectively controlling each of said exhaust bypass means, said removal means, and said inlet means.

15. A method for pretreating an alternate fuel to make it usable in fuel burning equipment comprising the steps of:

selecting an alternate fuel;

placing said alternate fuel in a volatilization chamber;

volatilizing said alternate fuel;

pretreating said volatilized alternate fuel by passing said volatilized alternate fuel through a reactor tube with a reactor rod mounted therein to form a reaction zone between the reactor rod and the reactor tube, said reactor tube being heated to produce a pretreated alternate fuel; and directing said pretreated alternate fuel into the internal combustion engine.

16. The method of claim 15, including the step of heating the reactor tube by mounting the reactor tube so that exhaust from the fuel burning equipment heats the reactor tube.

17. The method of claim 16, wherein the step of volatilization of the alternate fuel includes the step of volatilizing the alternate fuel in a volatilization chamber and heating the volatilization chamber with exhaust.

18. The method defined in claim 17 wherein said pretreating step includes controlling the pretreated alternate fuel to the internal combustion engine.

* * * * *